(12) United States Patent
Kuo et al.

(10) Patent No.: US 12,487,646 B2
(45) Date of Patent: Dec. 2, 2025

(54) SUPPORT DEVICE FOR AN EXPANSION CARD OF AN INFORMATION HANDLING SYSTEM

(71) Applicant: Dell Products L.P., Round Rock, TX (US)

(72) Inventors: Yu-Ming Kuo, New Taipei (TW); Chung-An Lin, New Taipei (TW); Qinghong He, Austin, TX (US); Derric Christopher Hobbs, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 577 days.

(21) Appl. No.: 17/821,745

(22) Filed: Aug. 23, 2022

(65) Prior Publication Data

US 2024/0069609 A1    Feb. 29, 2024

(51) Int. Cl.
- *G06F 1/18* (2006.01)
- *G06F 1/20* (2006.01)
- *H05K 7/20* (2006.01)

(52) U.S. Cl.
CPC ............. *G06F 1/186* (2013.01); *G06F 1/20* (2013.01); *H05K 7/20136* (2013.01)

(58) Field of Classification Search
CPC ........... G06F 1/186; G06F 1/20; G06F 1/185; H05K 7/20136–20163; H05K 7/20718–20727

See application file for complete search history.

(56) References Cited

U.S. PATENT DOCUMENTS

| 8,848,364 B2 * | 9/2014 | Crane ................. G06F 1/20 361/679.51 |
| 10,251,298 B1 * | 4/2019 | Lin ..................... G06F 1/183 |
| 2019/0227605 A1 * | 7/2019 | Wiltzius .......... H05K 7/20145 |

(Continued)

FOREIGN PATENT DOCUMENTS

CN    111749917 A    * 10/2020    ............... E06B 9/13

OTHER PUBLICATIONS

Gu Zhongli; Zheng Weimin; Feng Lehan; Chen Wenxing, "Fan opening and closing device and ventilating device", Oct. 9, 2020, Guangdong Fanshida Agriculture and Animal Husbandry Fans Co Ltd, Entire Document (Translation of CN 111749917) (Year: 2020).*

*Primary Examiner* — Stephen S Sul

(74) *Attorney, Agent, or Firm* — McDermott Will & Schulte LLP

(57) ABSTRACT

In one or more embodiments, an information handling system may include: at least one processor; a memory medium, communicatively coupled to the at least one processor, that stores an operating system and at least one application executable by the at least one processor; a chassis; an information handling system card port communicatively coupled to the at least one processor; a support device fastened to the chassis; and an expansion card coupled to the information handling system card port and fastened to the support device. In one or more embodiments, the support device may include an opening that permits air to pass through. In one or more embodiments, the support device may include a cover configured to obscure airflow through the opening of the support device. For example, the cover may be configured to unroll to obscure airflow through the opening of the support device.

17 Claims, 11 Drawing Sheets

(56) References Cited

U.S. PATENT DOCUMENTS

| | | | | |
|---|---|---|---|---|
| 2019/0324506 A1* | 10/2019 | Shabbir | ............ | H05K 7/20145 |
| 2020/0163251 A1* | 5/2020 | Chopra | ................... | G06F 1/20 |
| 2021/0181817 A1* | 6/2021 | Lu | ........................... | G06F 1/20 |
| 2022/0066523 A1* | 3/2022 | Wiltzius | .................. | G06F 1/20 |
| 2022/0075407 A1* | 3/2022 | Chen | ...................... | G06F 1/182 |
| 2023/0077052 A1* | 3/2023 | Henderson | ............ | G06F 1/189 |
| 2025/0107034 A1* | 3/2025 | D'Incà | .................. | F24F 13/12 |

\* cited by examiner

SUPPORT DEVICE FOR AN EXPANSION CARD OF AN INFORMATION HANDLING SYSTEM

BACKGROUND

Field of the Disclosure

This disclosure relates generally to information handling systems and more particularly to a support device for an expansion card of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, an information handling system may include: at least one processor; a memory medium, communicatively coupled to the at least one processor, that stores an operating system and at least one application executable by the at least one processor; a chassis; an information handling system card port communicatively coupled to the at least one processor; a support device fastened to the chassis; and an expansion card coupled to the information handling system card port and fastened to the support device. In one or more embodiments, the support device may include an opening that permits air to pass through. For example, the support device may include a cover configured to obscure airflow through the opening of the support device. In one instance, the cover may be configured to unroll to obscure airflow through the opening of the support device. In another instance, the cover may be a plate that may be configured to obscure airflow through the opening of the support device. As one example, the plate may include a polymer. As another example, the plate may include a metal.

In one or more embodiments, the expansion card may include at least one fan. For example, the cover may be configured to permit the at least one fan to move air through an unobscured portion of the opening. In one or more embodiments, the support device may include an adjustable mechanical holder system configured to fasten the expansion card to the support device. In one or more embodiments, the support device may be fastened to an expansion opening of the chassis. For example, a first sidewall of the chassis may include the expansion opening. For instance, the support device may be fastened to a second sidewall of the chassis, different from the first sidewall of the chassis.

In one or more embodiments, a support device of an information handling system expansion card may include: an opening configured to permit air to pass through; an adjustable cover configured to obscure airflow through at least a portion of the opening; an adjustable mechanical holder system configured to fasten the expansion card to the support device; and a bracket configured to fasten to an expansion card opening of a first sidewall of a chassis of the information handling system. In one or more embodiments, the support device may be configured to fasten to a second sidewall of the chassis of the information handling system.

In one or more embodiments, the support device may further include a cover configured to obscure airflow through the opening. In one example, the cover may be configured to unroll to obscure airflow through the opening of the support device. In another example, the cover may be a plate that is configured to obscure airflow through the opening of the support device. In one instance, the plate may include a polymer. In another instance, the plate may include a metal. In one or more embodiments, the expansion card may include at least one fan. For example, the cover may be configured to permit the at least one fan to move air through an unobscured portion of the opening. In one or more embodiments, the support device may further include another adjustable mechanical holder system configured to fasten the expansion card to the support device.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
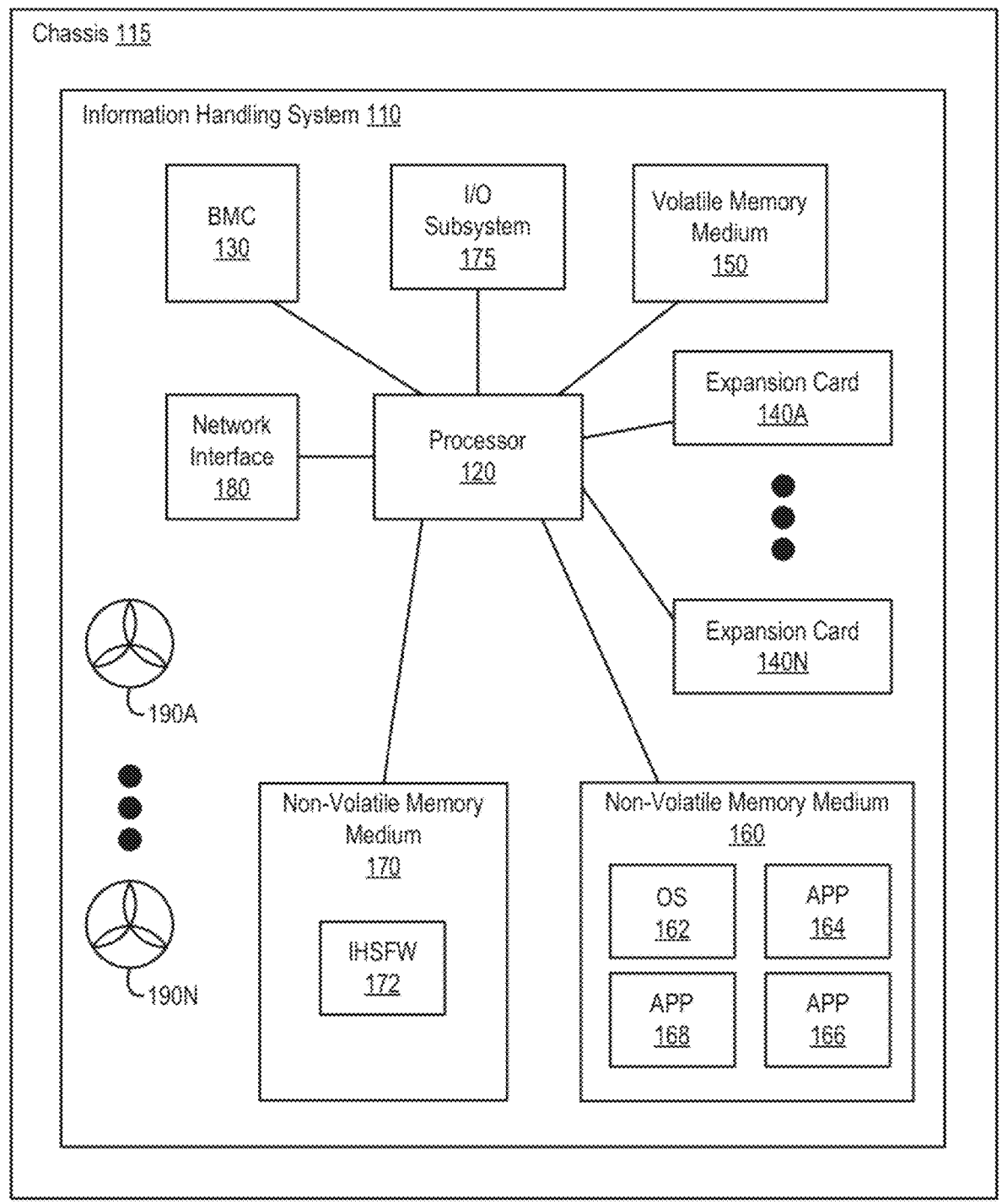
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an air-cooling system may meet a cooling need of an information handling system. For example, the air-cooling system may utilize multiple fans to move air into, from, and through the information handling system. In one or more embodiments, as a revolutions per minute (RPM) of a fan increases, noise (e.g., sounds, sound pressure levels, etc.) generated by the fan may increase. For example, noise generated by the multiple fans, when they operate at or above a threshold RPM, may cause annoyance and/or discomfort to a user (e.g., a person).

In one or more embodiments, as a size of an expansion card increases in size, a weight of the expansion card may increase. In one example, an expansion card may be a Peripheral Component Interconnect (PCI) card. In another example, an expansion card may be a PCI Express (PCIe) card. For instance, a PCIe card may include a graphics expansion card. As an example, the graphics expansion card may include one or more graphics processing units (GPUs). In one or more embodiments, if an expansion card meets or exceeds a threshold weight, one or more additional support structures may be needed to secure the expansion card within a chassis of an information handling system. For example, the threshold weight may be 2.2 pounds (1 kg), among others.

In one or more embodiments, the support device may function with expansion cards of various sizes and/or of various weights. In one example, the support device may include an adjustable mechanical holder system and/or holder device to provide mechanical support to expansion cards of various sizes and/or of various weights. In another example, the support device may include a configurable airflow system that may aid and/or enhance one or more fans of expansion cards of various sizes and/or of various weights. In one or more embodiments, a support device may be installed adjacent to (e.g., next to) an expansion card. For example, a support device may include a PCIe filler. For instance, a PCIe filler may be installed (e.g., plugged into) next to a PCIe expansion card.

In one or more embodiments, the support device may have an adjustable thermal opening that may accommodate one or more lengths and/or one or more heights of expansion cards. For example, the adjustable opening may include a first cover (e.g., a curtain, a screen, etc.). For instance, the adjustable opening may include a spiral torsion spring that may scroll in and/or may scroll out the first cover. In another example, the adjustable opening may include a second cover. For instance, the second cover may slide in a direction perpendicular to the first cover. In one or more embodiments, the first cover and the second cover may be utilized to configure the adjustable opening. In one example, the first cover may be utilized to configure the adjustable opening in association with an X-axis of the adjustable opening. In another example, the second cover may be utilized to configure the adjustable opening in association with a Y-axis of the adjustable opening.

In one or more embodiments, an expansion card may include one or more fans. For example, the one or more fans may move air to remove heat from one or more portions of the expansion card. In one or more embodiments, the one or more fans of the expansion card may be assembled to and/or sealed against the adjustable opening of the support device. For example, the adjustable opening of the support device may pressurize at least a portion of the expansion card. For instance, the adjustable opening of the support device may pressurize a cooler and/or a cooling system of the expansion card.

In one or more embodiments, an added cooling capacity provided by the adjustable opening of the support device may permit a fan of the expansion card to operate at a lower RPM. For example, when the fan of the expansion card operates at the lower RPM, the fan may generate less noise. For instance, the fan of the expansion card, when utilized with the adjustable opening of the support device, may operate at a percentage quieter. As an example, the fan of the expansion card, when utilized with the adjustable opening of the support device, may operate fourteen percent (14%) quieter. In one or more embodiments, an added cooling capacity provided by the adjustable opening of the support device may permit the expansion card to process additional information without increasing an RPM of a fan of the expansion card. For example, an added cooling capacity provided by the adjustable opening of the support device may permit the expansion card to process additional information without increasing noise generated by the fan of the expansion card. In one or more embodiments, an added cooling capacity provided by the adjustable opening of the support device may permit the expansion card, with a passive cooling system, to process additional information.

In one or more embodiments, a partition wall mounted on the support device may force airflow from bottom fans into the expansion card (e.g., packing more air into the expansion card) and may separate intake airflow of the expansion card and exhaust airflow of the expansion card, which may prevent air recirculation. For example, preventing air recirculation may increase a thermal effectiveness of the expansion card. For instance, a fan of the expansion card may operate at a lower RPM (e.g., operate quieter) when the partition wall prevents air recirculation. As an example, a fan of the expansion card may operate nineteen percent (19%) quieter when the partition wall prevents air recirculation.

In one or more embodiments, the partition wall of the support device may partition an information handling system at least two portions. In one example, a first portion of the at least two portions may include a first volume above the expansion card. For instance, the first volume above the expansion card may include a first airflow zone. In another example, a second portion of the at least two portions may include a second volume below the expansion card. For instance, the second volume below the expansion card may include a second airflow zone. In one or more embodiments, the support device may include a retention holder. For example, the retention holder of the support device may support the expansion card in a Z-axis direction.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

In one or more embodiments, IHS 110 may include a chassis 115. For example, chassis 115 may house IHS 110. In one or more embodiments, IHS 110 may include a processor 120, a baseboard management controller (BMC) 130, a volatile memory medium 150, non-volatile memory media 160 and 170, an I/O subsystem 175, and a network interface 180. For example, BMC 130, volatile memory medium 150, non-volatile memory media 160 and 170, I/O subsystem 175, and network interface 180 may be communicatively coupled to processor 120.

In one or more embodiments, IHS 110 may include one or more expansion cards 140. For example, IHS 110 may include expansion cards 140A-140N. Although expansion cards 140A-140N are illustrated, IHS 110 may include any number of expansion cards 140, according to one or more embodiments.

In one or more embodiments, an expansion card 140 may be communicatively coupled to processor 120. For example, an expansion card 140 may be communicatively coupled to processor 120 via PCIe. For instance, an expansion card 140 may be communicatively coupled to processor 120 via one or more of a PCIe switch, a PCIe root complex, and a platform controller hub, among others.

In one or more embodiments, an information handling system may include one or more fans. For example, IHS 110 may include fans 190A-190N. Although IHS 110 is illustrated as including fans 190A-190N, IHS 110 may include any number of fans 190, according to one or more embodiments. In one or more embodiments, a fan 190 may move air. In one example, a fan 190 may move air within IHS 110. In a second example, a fan 190 may move air into IHS 110, may intake air into IHS 110, and/or may bring air into IHS 110. In another example, a fan 190 may move air out of IHS 110, may remove air from IHS 110, and/or may expel air from IHS 110. In one or more embodiments, BMC 130 may control one or more of fans 190A-190N. For example, BMC 130 may provide control information to a fan controller (not specifically illustrated), which may control one or more of fans 190A-190N. For instance, BMC 130 may provide control information to the fan controller via a SMBus. In one or more embodiments, a fan 190 may generate one or more sounds and/or one or more vibrations as fan 190 operates to move air. In one or more embodiments, the one or more sounds the fan 190 generates may be quantified as one or more sound pressure levels.

In one or more embodiments, chassis 115 may house one or more components of IHS 110. For example, the one or more components of IHS 110 may include one or more of processor 120, BMC 130, expansion cards 140A-140N, volatile memory medium 150, non-volatile memory media 160 and 170, I/O subsystem 175, network interface 180, and fans 190A-190N, among others.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCIe root complexes. In another example, one or more of BMC 130, I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated). In one or more embodiments, a HDD (e.g., a hard disk drive, a hard disk, a hard drive, etc.) may be or include an electro-mechanical data storage device. For example, the HDD may store and may retrieve digital data using magnetic storage via one or more rigid rotating platters, which may be coated with magnetic material. For instance, the platters may be associated with one or more magnetic heads, which may be arranged on a movable actuator arm. As an example, the one or more magnetic heads may read data from and write data to the platter surfaces. In one or more embodiments, data may be accessed in a random-access manner, which may include accessing individual blocks of data that may be stored and retrieved in any order. In one or more embodiments, a HDD may be a type of a non-volatile memory medium, which can retain stored data even when powered off and/or when power is removed from the HDD. In one or more embodiments, a non-volatile memory medium 160 may include a HDD.

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 1B:
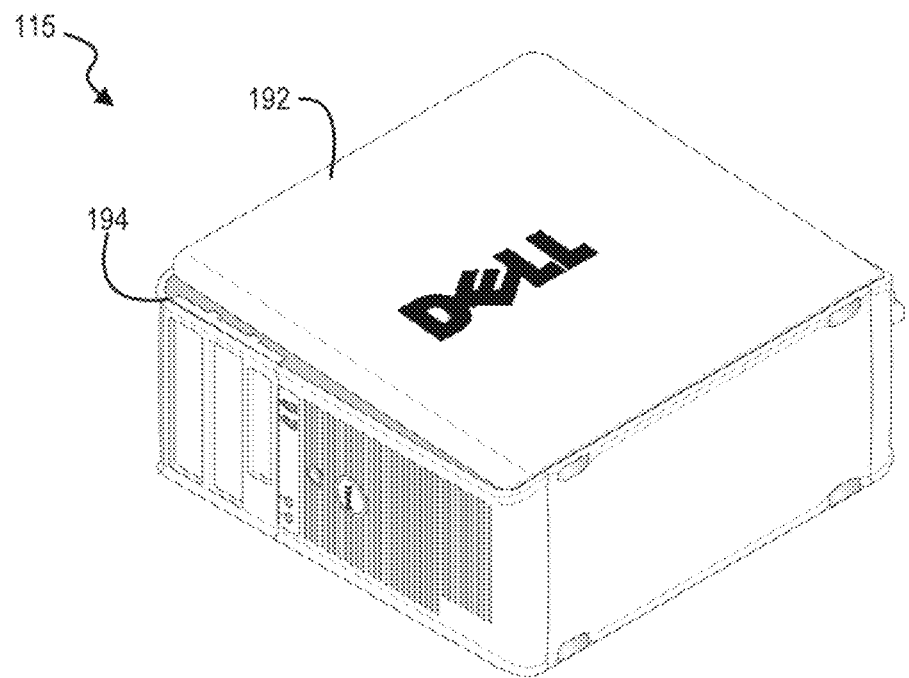
FIG. 1B illustrates an example of a chassis of an information handling system, according to one or more embodiments.

Turning now to FIG. 1B, an example of a chassis of an information handling system is illustrated, according to one or more embodiments. In one or more embodiments, chassis 115 may include a first portion 192 and a second portion 194. In one example, chassis portion 192 may be a lid of chassis 115. In another example, chassis portion 194 may be a chassis body of chassis 115. In one instance, chassis portion 194 may house a motherboard of IHS 110. In another instance, chassis portion 194 may house one or more components of IHS 110. As an example, the one or more components of IHS 110 may include one or more of a motherboard, processor 120, BMC 130, volatile memory medium 150, non-volatile memory media 160 and 170, I/O subsystem 175, network interface 180, and fans 190A-190N, among others. In one or more embodiments, chassis portion 194 may include a bottom wall, a first sidewall, a second sidewall, a front sidewall, and a back sidewall wall. For example, when chassis portion 192 is placed or affixed to the first sidewall of chassis portion 194, the second sidewall of chassis portion 194, the front sidewall of chassis portion 194, and the back sidewall of chassis portion 194, chassis portion 192 may form a top wall of chassis 115. In one or more embodiments, chassis portion 192 may be removed from chassis portion 194 to service, to repair, to remove a component from, and/or to add a component to IHS 110. For example, chassis portion 192 may be replaced to chassis portion 194.

Figure 2A:
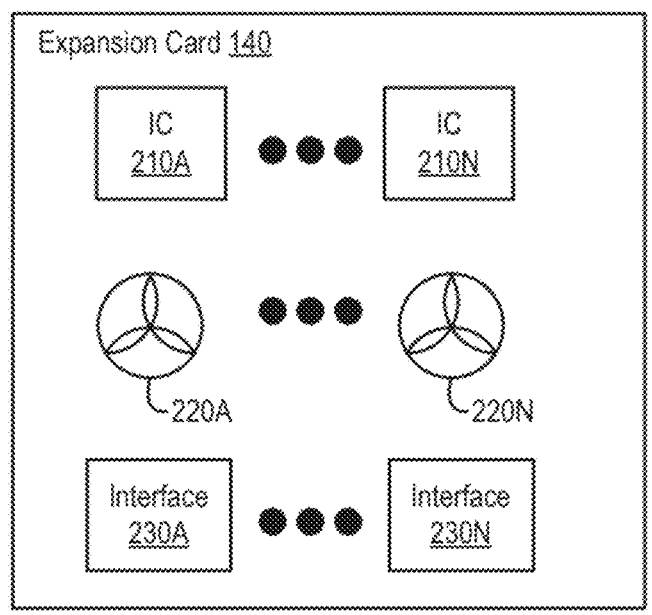
FIG. 2A illustrates an example of an expansion card, according to one or more embodiments.

Turning now to FIG. 2A, an example of an expansion card is illustrated, according to one or more embodiments. In one or more embodiments, an expansion card 140 may include one or more integrated circuits (ICs) 210A-210N. Although ICs 210A-210N are illustrated, expansion card 140 may include any number of ICs 210. In one or more embodiments, an integrated circuit (IC) 210 may include a graphics processing unit (GPU). For example, a GPU may include a generic processor graphics processing unit (GPGPU). In one or more embodiments, a GPU may include one or more processor units. In one or more embodiments, an expansion card 140 may be a graphics card. For example, the graphics card may include one or more graphics processing units (GPUs).

In one or more embodiments, an expansion card may include one or more fans. For example, expansion card 140 may include fans 220A-220N. Although expansion card 140 is illustrated as including fans 220A-220N, expansion card 140 may include any number of fans 220, according to one or more embodiments. In one or more embodiments, a fan 220 may move air. In one example, a fan 220 may move air within IHS 110. In another example, a fan 220 may move air onto expansion card 140 and/or may remove air from expansion card 140. In one or more embodiments, expansion card 140 may control one or more of fans 220A-220N. For example, expansion card 140 may provide control information to a fan controller (not specifically illustrated), which may control one or more of fans 220A-220N. In one or more embodiments, BMC 130 may control one or more of fans 220A-220N. For example, BMC 130 may provide control information to a fan controller (not specifically illustrated), which may control one or more of fans 220A-220N. For instance, BMC 130 may provide control information to the fan controller via a SMBus. In one or more embodiments, a fan 220 may generate one or more sounds and/or one or more vibrations as fan 220 operates to move air. In one or more embodiments, the one or more sounds the fan 220 generates may be quantified as one or more sound pressure levels.

In one or more embodiments, an expansion card may include interfaces. For example, expansion card 140 may include interfaces 230A-230N. Although expansion card 140 is illustrated as including interfaces 230A-230N, expansion card 140 may include any number of interfaces 230, according to one or more embodiments. In one or more embodiments, an interface 230 may be or may include a communication interface. For example, an interface 230 may be utilized to communicatively couple expansion card 140 with processor 120. For instance, an interface 230 may be utilized to communicate data to and/or from expansion card 140. In one or more embodiments, an interface 230 may be or may include a USB interface. For example, an interface 230 may be compliant with a USB specification. In one or more embodiments, an interface 230 may be or may include a PCIe interface. For example, an interface 230 may be compliant with a PCIe specification.

Figure 2B:
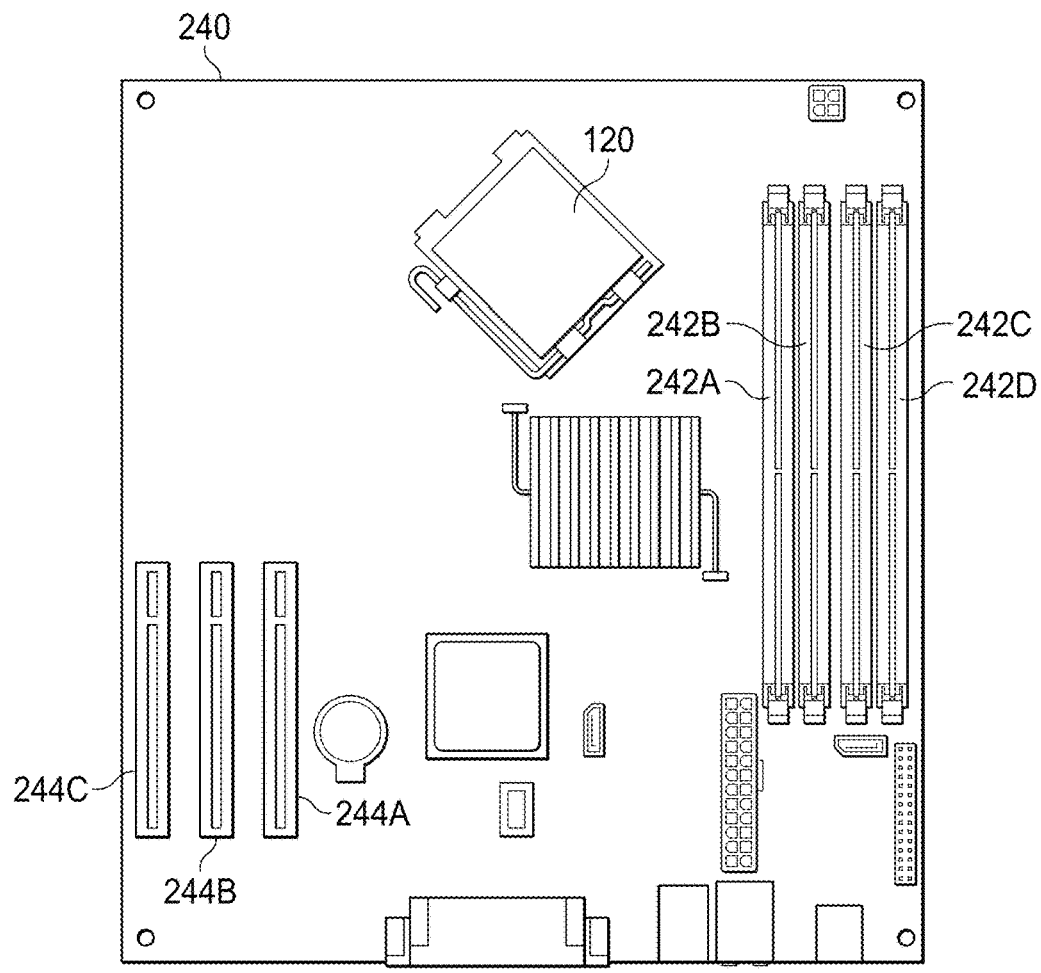
FIG. 2B illustrates an example of a motherboard of an information handling system, according to one or more embodiments.

Turning now to FIG. 2B, an example of a motherboard of an information handling system is illustrated, according to one or more embodiments. In one or more embodiments, IHS 110 may include a motherboard 240. For example, processor 120 may be installed on motherboard 240. In one or more embodiments, motherboard 240 may include one or more memory ports. For example, motherboard 240 may include memory ports 242A-242D. For instance, a dual in-line memory module (DIMN) may be installed in a memory port 242. In one or more embodiments, one or more dual in-line memory modules (DIMMs) may implement volatile memory medium 150. In one or more embodiments, a memory port may be called a memory slot. Although motherboard 240 is illustrated with memory ports 242A-242D, motherboard 240 may include any number of memory ports 242, according to one or more embodiments.

Figure 2C:
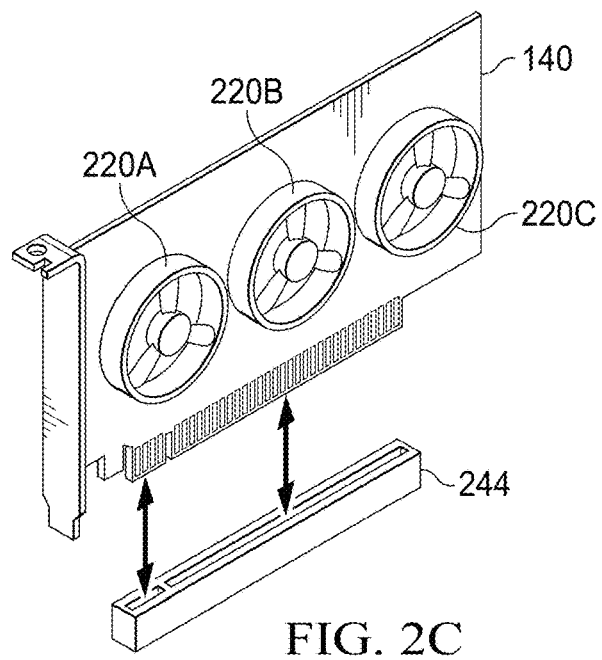
FIG. 2C illustrates an example of an expansion card and an information handling system card port, according to one or more embodiments.

In one or more embodiments, motherboard 240 may include one or more information handling system card ports. For example, motherboard 240 may include information handling system card ports 244A-244C. For instance, an expansion card 140 may be installed in or removed from an information handling system card port 244, as illustrated in FIG. 2C. In one or more embodiments, an information handling system card port 244 may be an information handling system card receptacle. In one or more embodiments, an information handling system card port 244 may be communicatively coupled to processor 120. For example, an information handling system card port 244 may be communicatively coupled to processor 120 via a PCIe coupling. For instance, an information handling system card port 244 may be communicatively coupled to processor 120 via a PCIe root complex and/or a PCIe switch, among others. Although motherboard 240 is illustrated with information handling system card ports 244A-244C, motherboard 240 may include any number of information handling system card ports 244, according to one or more embodiments. In one or more embodiments, an information handling system card port may be called an information handling system card slot. In one or more embodiments, an information handling system card port may be called an expansion card port. In one or more embodiments, an information handling system card port may be called an expansion card slot.

In one or more embodiments, a user (e.g., an end user, a customer, an administrator, etc.) may install an expansion card 140 in an information handling system card port 244. In one or more embodiments, an original equipment manufacturer (OEM) of IHS 110 may install an expansion card 140 in an information handling system card port 244. For example, the user (e.g., the end user, the customer, etc.) may receive IHS 110 with an expansion card 140 already installed in an information handling system card port 244.

Figure 3A:
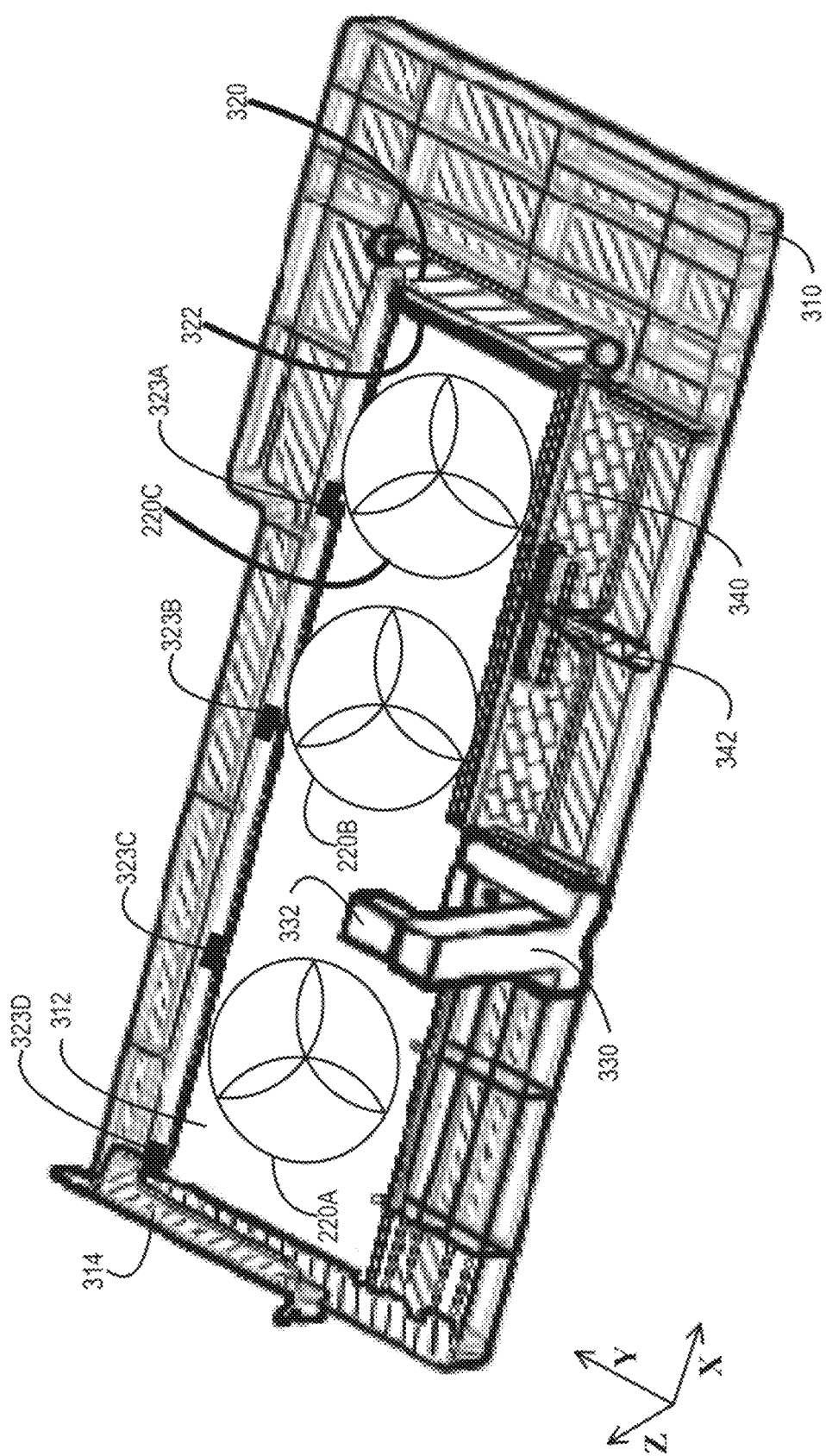
FIG. 3A illustrates an example of a support device, according to one or more embodiments.

Turning now to FIG. 3A, an example of a support device is illustrated, according to one or more embodiments. In one or more embodiments, a support device 310 may include an opening 312. For example, opening 312 may permit air to flow through support device 310. For instance, opening 312 may permit fans 220A-220C to move air through support device 310. In one or more embodiments, support device 310 may include a cover 320. For example, cover 320 may be unwound via a handle 322. For instance, cover 320 may be spring wound. In one or more embodiments, cover 320 may be made of a polymer. For example, cover 320 may be a plastic film or a plastic foil. In one or more embodiments, cover 320 may obstruct at least a portion of opening 312. In one example, cover 320 may obstruct a portion of opening 312. In another example, cover 320 may obstruct all of opening 312.

In one or more embodiments, support device 310 may include sockets 323. For example, handle 322 may fit into a socket 323. For instance, handle 322 may fit into one of sockets 323A-323D to obscure opening 312. As an example, when opening 312 is obscured, an amount of air permitted to flow through opening 312 may be decreased. Although sockets 323A-323D are illustrated, support device 310 may include any number of sockets 323, according to one or more embodiments.

In one or more embodiments, support device 310 may include adjustable mechanical holder system 330. For example, adjustable mechanical holder system 330 may include a holder device 332. For instance, holder device 332 may secure expansion card 140 to support device 310. In one or more embodiments, adjustable mechanical holder system 330 may move along or parallel to an X-axis. For example, adjustable mechanical holder system 330 may move along or parallel to the X-axis to secure expansion card 140 to support device 310. In one or more embodiments, adjustable mechanical holder system 330 may move along or parallel to a Y-axis. For example, adjustable mechanical holder system 330 may move along or parallel to the Y-axis to secure expansion card 140 to support device 310. In one or more embodiments, holder device 332 may move along or parallel to a Z-axis. For example, holder device 332 may move along or parallel to the Z-axis to secure expansion card 140 to support device 310.

In one or more embodiments, holder device 332 may include a pin or boss that may insert into an opening of adjustable mechanical holder system 330. For example, the pin or boss of holder device 332 may secure holder device 332 from movement. For instance, the pin or boss of holder device 332 may secure holder device 332 from movement along or parallel to the Z-axis. In one or more embodiments, holder device 332 may include a lead nut that may interface with a lead screw of adjustable mechanical holder system 330. In one example, the lead nut of holder device 332 may secure holder device 332 from movement. For instance, the lead nut of holder device 332 may secure holder device 332 from movement along or parallel to the Z-axis. In another example, when the lead screw of adjustable mechanical holder system 330 is rotated, holder device 332 may move along or parallel to the Z-axis. For instance, when the lead screw of adjustable mechanical holder system 330 is rotated, holder device 332 may move along or parallel to the Z-axis to secure expansion card 140 to support device 310. In one or more embodiments, support device 310 may include a cover 340. For example, a spring 342 may secure cover 340. Although cover 340 is illustrated on a first side of support device 310, cover 340 may be on a second side of support device 310, in which the second side of support device 310 is opposite the first side of support device 310 where cover 340 is shown, according to one or more embodiments.

Figure 3B:
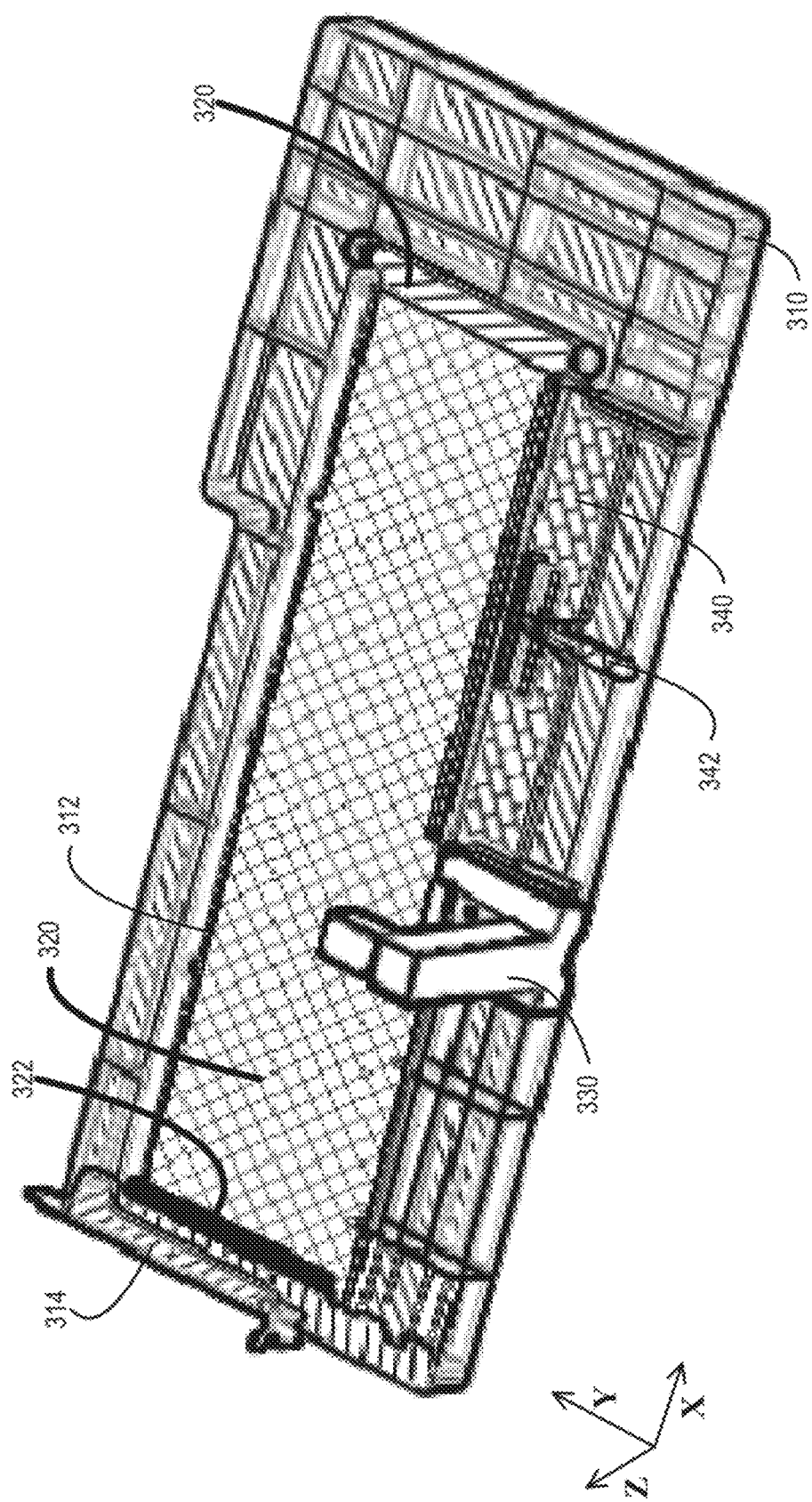
FIG. 3B a illustrates second example of a support device, according to one or more embodiments.

Turning now to FIG. 3B, a second example of a support device is illustrated, according to one or more embodiments. As shown, cover 320 may obstruct opening 312. For example, cover 320 may obstruct all of opening 312.

Figure 3C:
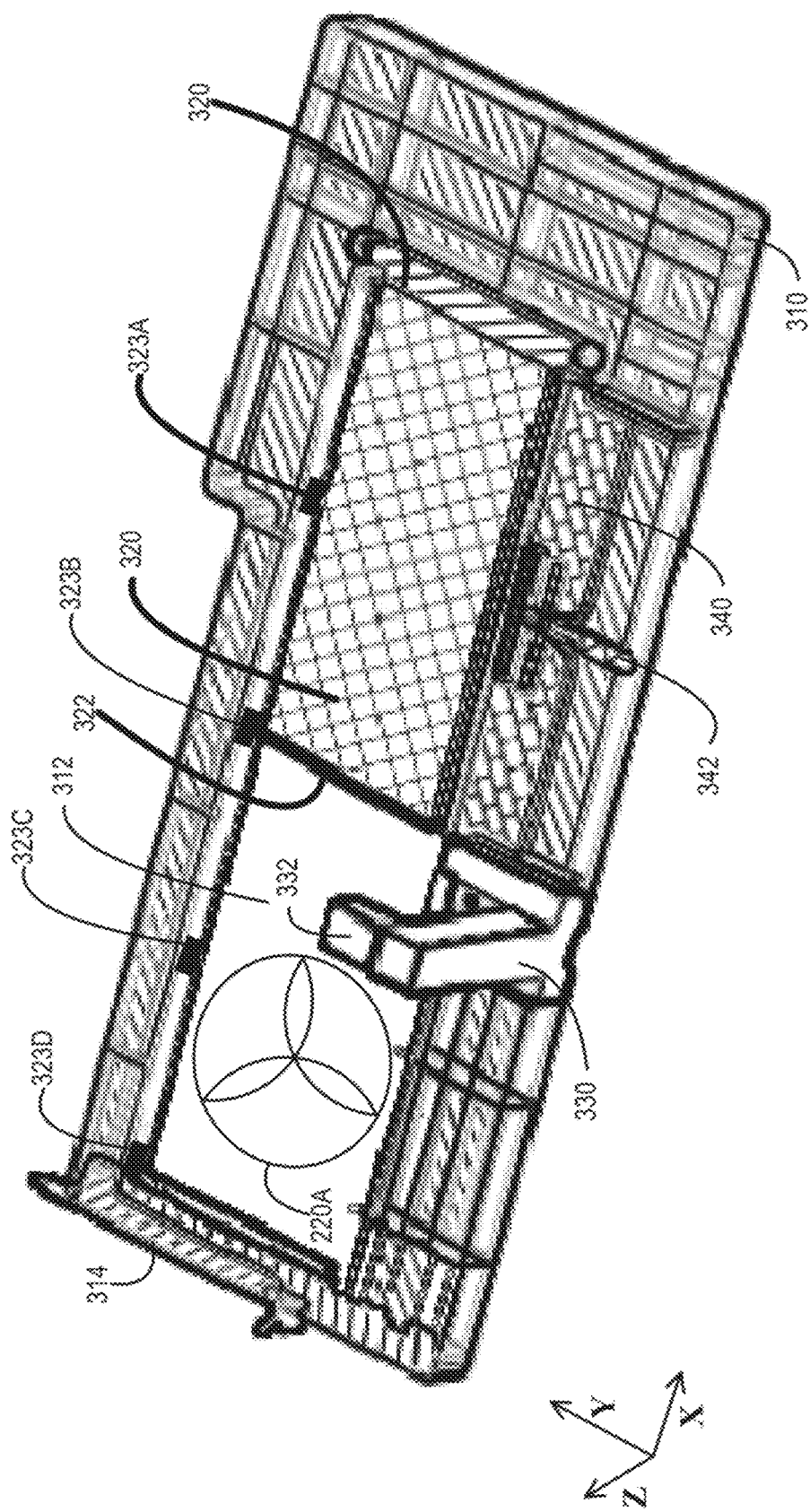
FIG. 3C illustrates a third example of a support device, according to one or more embodiments.

Turning now to FIG. 3C, a third example of a support device is illustrated, according to one or more embodiments. As shown, cover 320 may partially obstruct opening 312. For example, cover 320 may obstruct a portion of opening 312. For instance, handle 322 may be fitted into socket 323B. In one or more embodiments, cover 320 may obstruct air from flowing through opening 312. For example, cover 320 may form a partition wall of support device 310, which may force airflow from one or more fans into expansion card 140 and may separate intake airflow of expansion card 140 and exhaust airflow of expansion card 140. For instance, cover 320 may prevent air recirculation. For example, preventing air recirculation may increase a thermal effectiveness of expansion card 140. For instance, a fan 220 of the expansion card may operate at a lower RPM (e.g., operate quieter) when cover 320 prevents air recirculation. As an example, a fan 220 of expansion card 140 may operate nineteen percent (19%) quieter when cover 320 prevents air recirculation.

In one or more embodiments, cover 320 and support device 310 may partition IHS 110 into at least two portions. In one example, a first portion of the at least two portions may include a first volume above expansion card 140. For instance, the first volume above expansion card 140 may include a first airflow zone. In another example, a second portion of the at least two portions may include a second volume below expansion card 140. For instance, the second volume below expansion card 140 may include a second airflow zone.

Figure 3D:
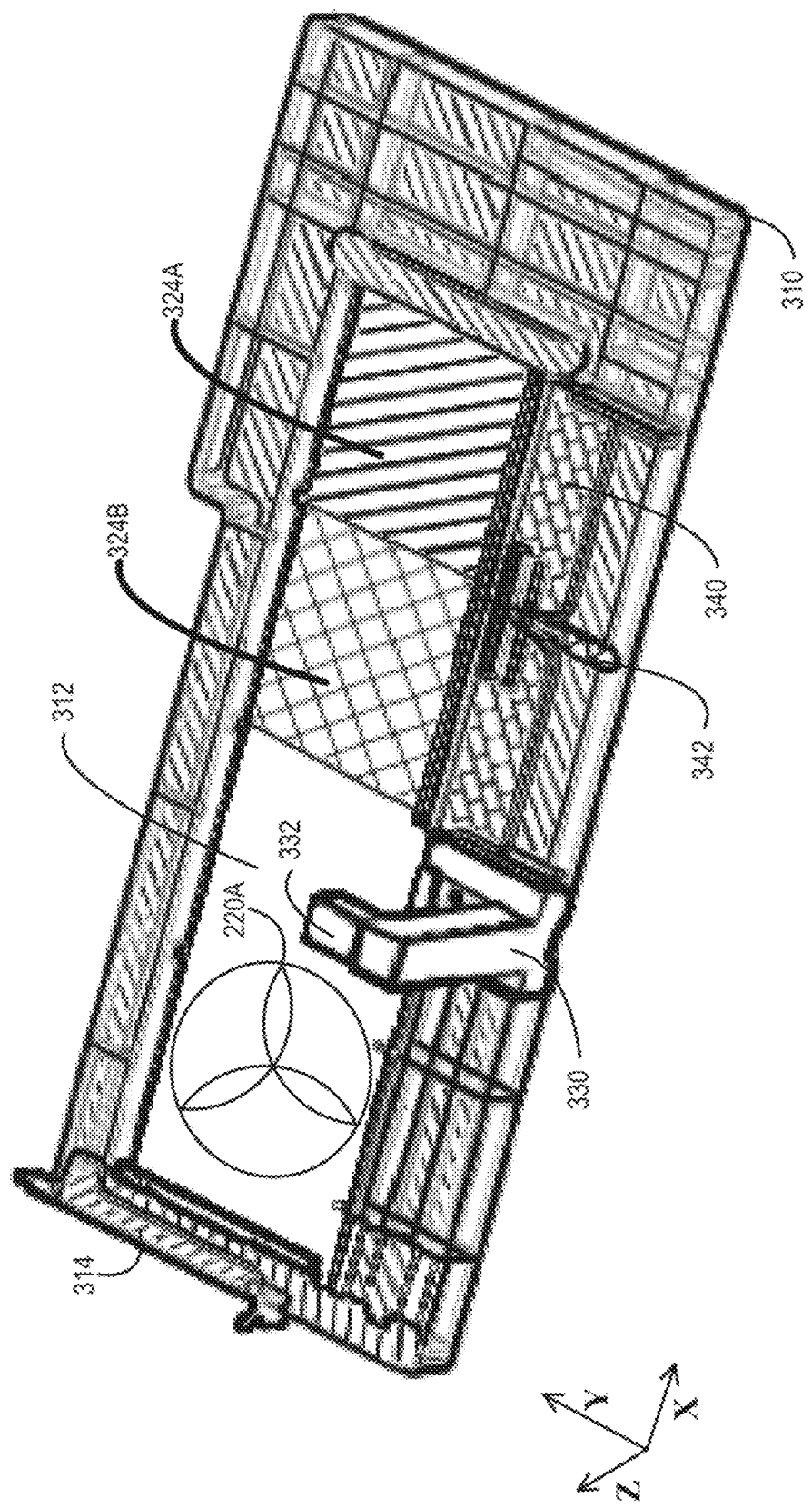
FIG. 3D illustrates a fourth example of a support device, according to one or more embodiments.

Turning now to FIG. 3D, a fourth example of a support device is illustrated, according to one or more embodiments. In one or more embodiments, one or more covers 324 may obstruct opening 312. As shown, covers 324A and 324B may obstruct opening 312. For example, covers 324A and 324B may partially obstruct opening 312. In one or more embodiments, a cover 324 may be a plate. In one example, the plate may be rectangular in shape. In another example, the plate may be square in shape. Although covers 324A and 324B are illustrated, any number of covers may obstruct opening 312, according to one or more embodiments.

In one or more embodiments, a cover 324 may include one or more of a polymer and a metal. In one example, a cover 324 may include only a polymer. In a second example, a cover 324 may include only a metal. In a third example, a cover 324 may include only a metal alloy. In another example, cover 324 may include a polymer and a metal. For instance, cover 324 may include a polymer and a metal alloy.

Figure 3E:
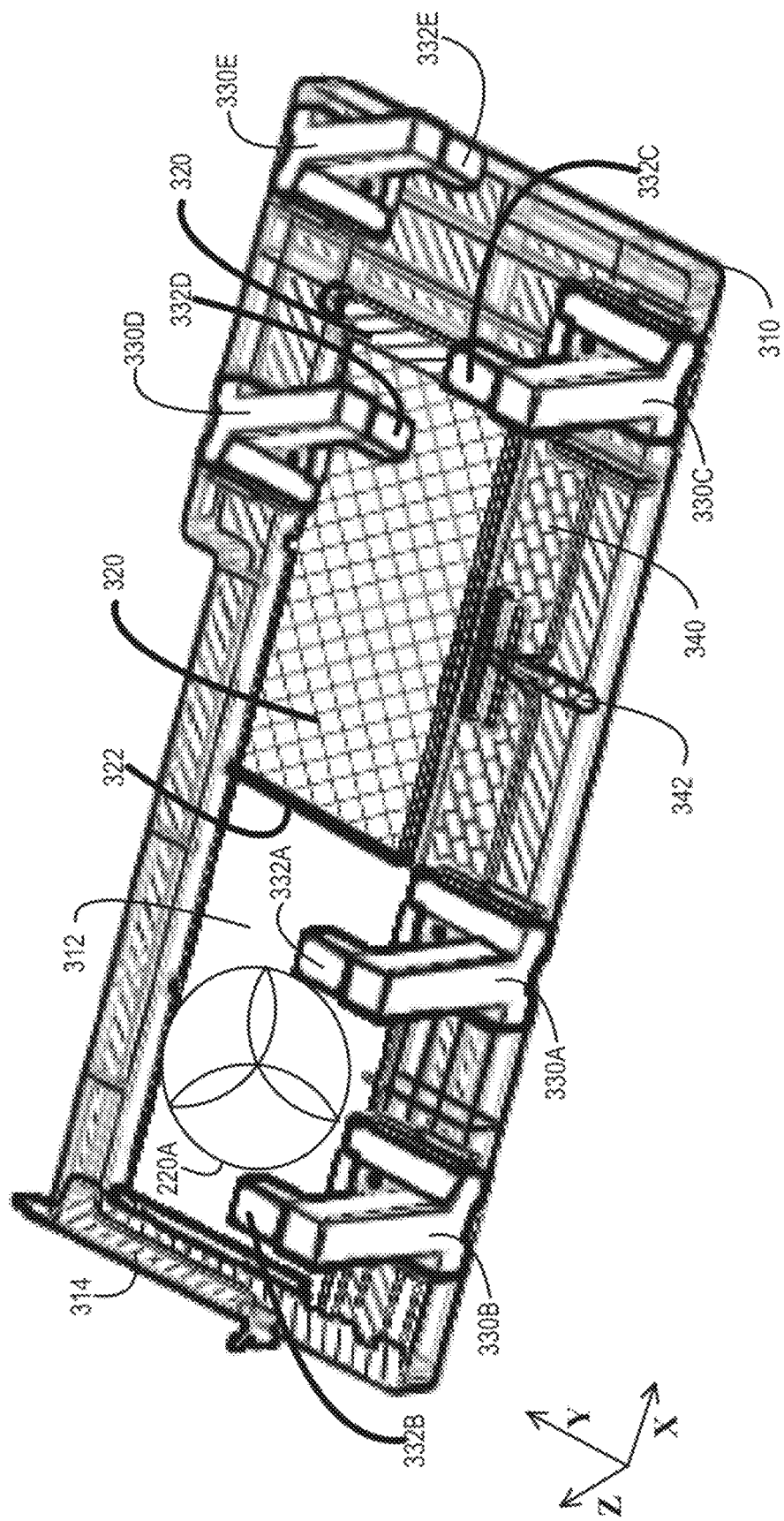
FIG. 3E illustrates another example of a support device, according to one or more embodiments.

Turning now to FIG. 3E, another example of a support device is illustrated, according to one or more embodiments. In one or more embodiments, support device 310 may include one or more adjustable mechanical holder systems 330. As shown, support device 310 may include adjustable mechanical holder systems 330A-330E. For example, adjustable mechanical holder systems 330A-330E may respectively include holder devices 332A-332E. Although adjustable mechanical holder systems 330A-330E are illustrated, support device 310 may include any number of adjustable mechanical holder systems 330, according to one or more embodiments. For example, support device 310 may be configured with a number of adjustable mechanical holder systems 330 based at least on a size of an expansion card 140 and/or a based at least on weight of an expansion card 140.

Figure 3F:
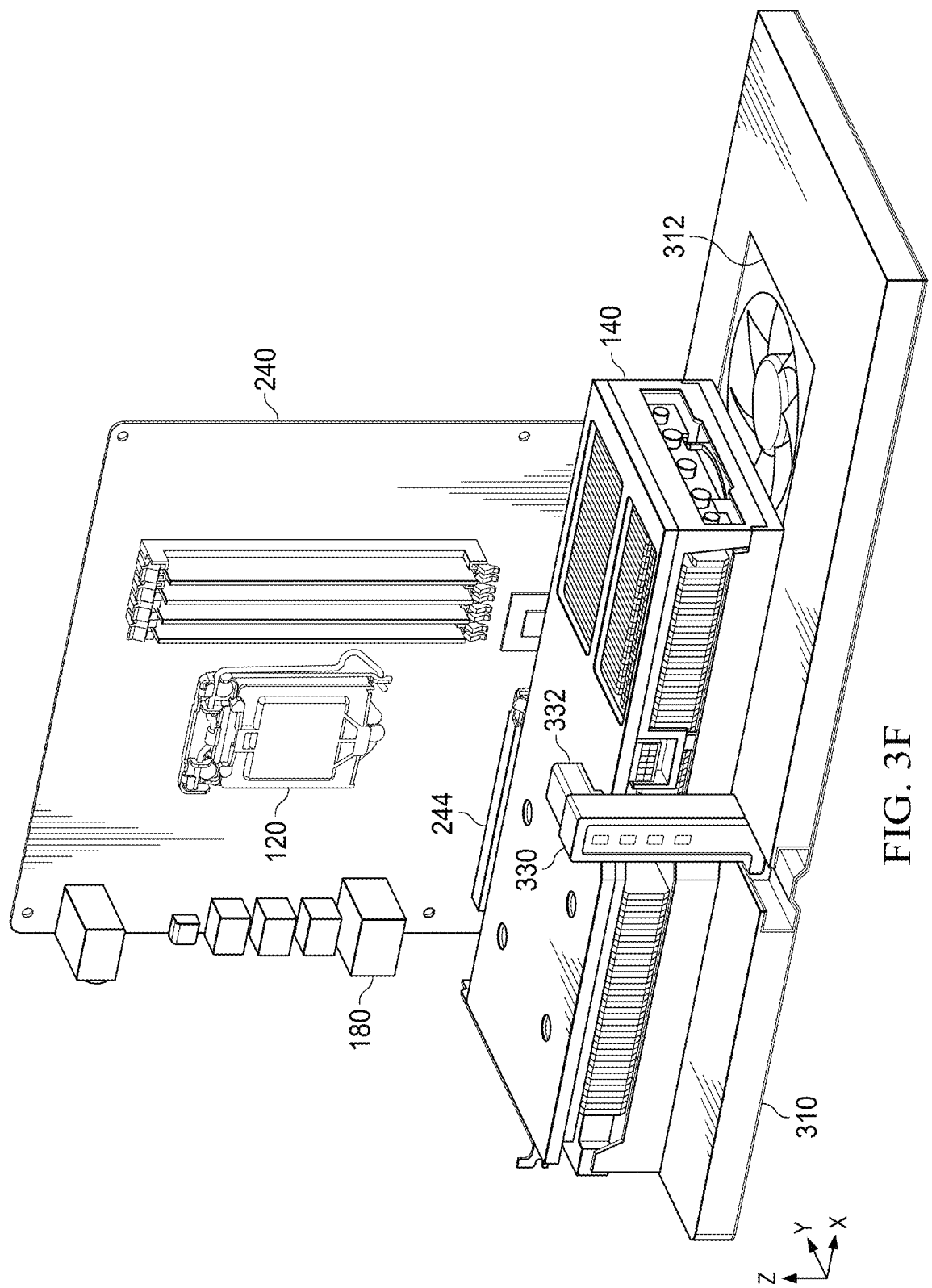
FIG. 3F illustrates an example of an expansion card installed in a motherboard and mounted to a support device, according to one or more embodiments.

Turning now to FIG. 3F, an example of an expansion card installed in a motherboard and mounted to a support device is illustrated, according to one or more embodiments. In one or more embodiments, expansion card 140 may be installed in motherboard 240. For example, expansion card 140 may be mounted in information handling system card port 244 of motherboard 240. In one or more embodiments, expansion card 140 may be mounted and/or secured to support device 310. For example, adjustable mechanical holder system 330 may secure expansion card 140 to support device 310. For instance, holder device 332 of adjustable mechanical holder system 330 may secure expansion card 140 to support device 310. As an example, holder device 332 and adjustable mechanical holder system 330 may clamp and/or fasten expansion card 140 to support device 310.

Figure 3G:
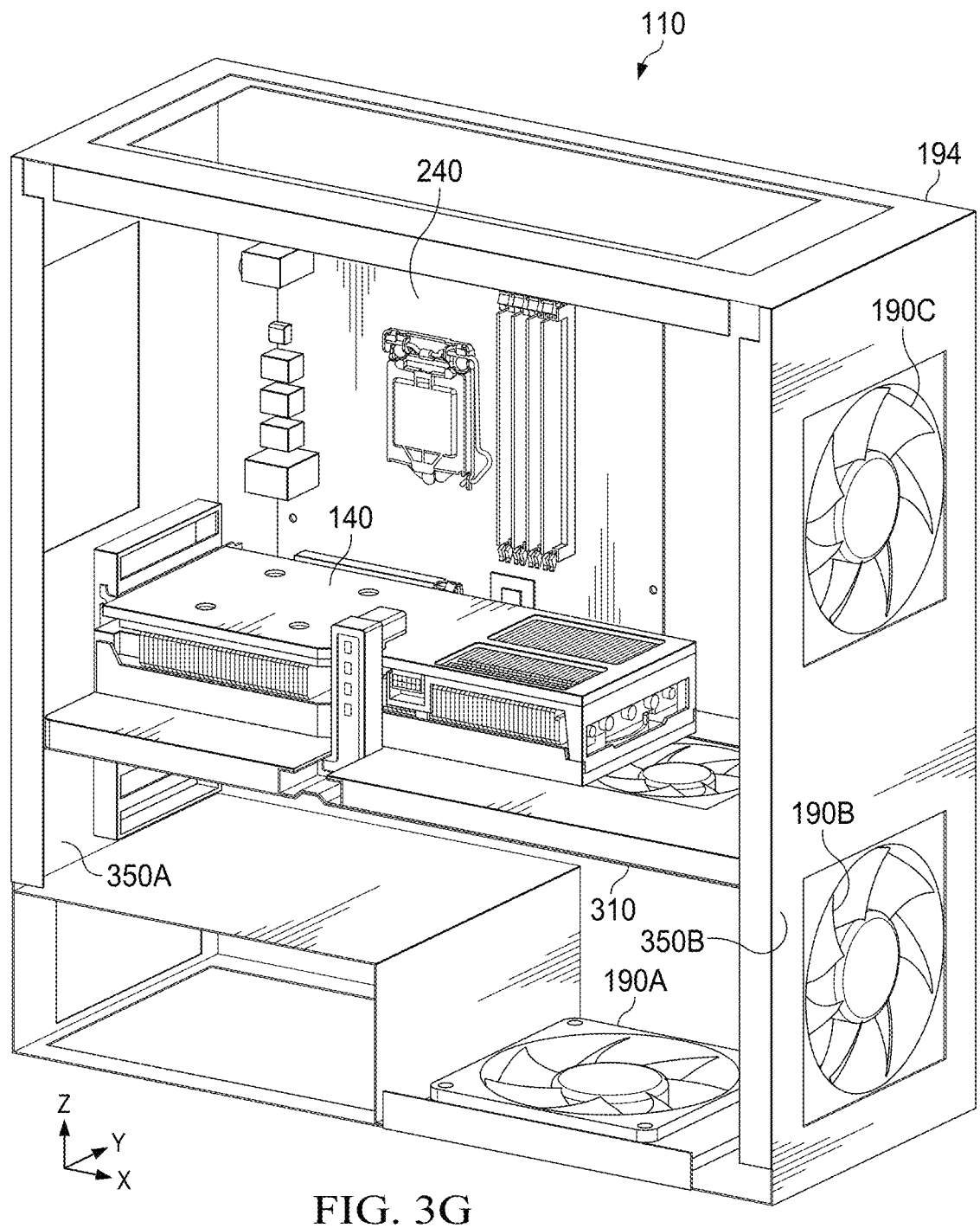
FIG. 3G illustrates an example of an expansion card installed in a motherboard and mounted to a support device that is installed in an information handling system, according to one or more embodiments.

Turning now to FIG. 3G, an example of an expansion card installed in a motherboard and mounted to a support device that is installed in an information handling system is illustrated, according to one or more embodiments. In one or more embodiments, IHS 110 may include motherboard 240. For example, motherboard 240 may be installed and/or mounted in chassis portion 194. In one or more embodiments, fans 190A-190C may be installed and/or mounted in chassis portion 194.

In one or more embodiments, chassis portion 194 may include sidewall 350A and a sidewall 350B. In one example, support device 310 may be mounted and/or fastened to sidewall 350A. In one instance, support device 310 may be mounted and/or fastened to sidewall 350A via an expansion card opening of sidewall 350A. In another instance, bracket 314 of support device 310 may interface with the expansion card opening of sidewall 350A and may mount and/or fastened support device 310 and bracket 314 to sidewall 350A. For instance, bracket 314 of support device 310 may be utilized as an expansion slot insert in an expansion slot of chassis portion 194. In another example, support device 310 may be mounted and/or fastened to sidewall 350B. For instance, support device 310 may be mounted and/or fastened to sidewall 350B via a fastener. In one or more embodiments, sidewall 350A may be opposite to sidewall 350B. For example, sidewall 350A may be parallel to sidewall 350B.

Figure 4:
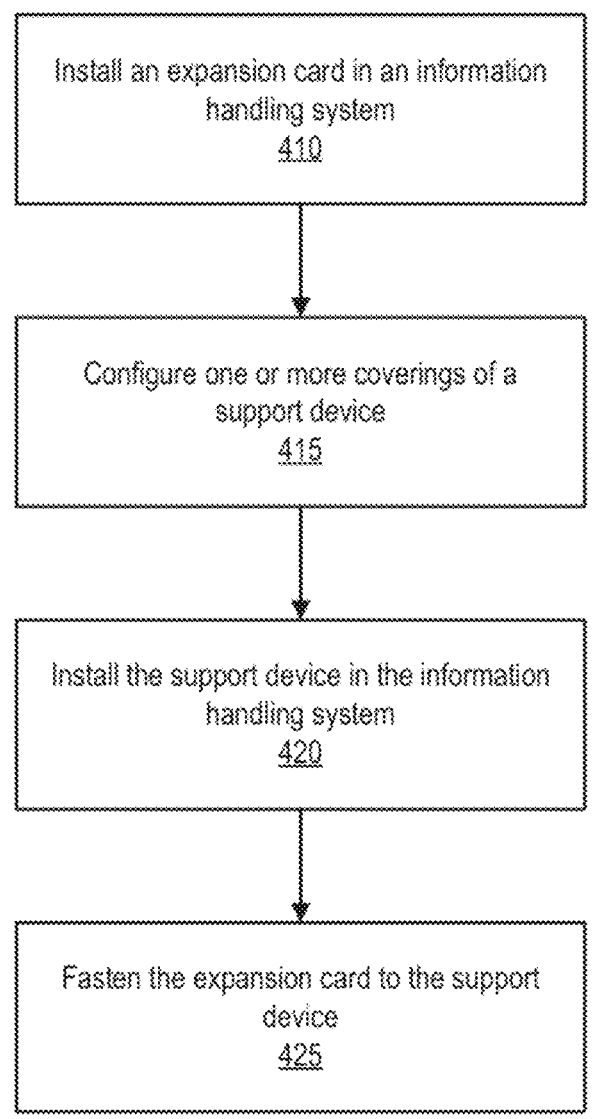
FIG. 4 illustrates an example of a method of configuring an information handling system, according to one or more embodiments.

Turning now to FIG. 4, an example of a method of configuring an information handling system is illustrated, according to one or more embodiments. At 410, an expansion card may be installed in an information handling system. For example, expansion card 140 may be installed in IHS 110. In one instance, expansion card 140 may be installed in information handling system card port 244 of motherboard 240. In another instance, expansion card 140 may be installed in information handling system card port 244 of IHS 110.

At 415, one or more coverings of a support device may be configured. In one example, covering 320 of support device 310 may be configured. In one instance, covering 320 of support device 310 may be configured to obscure a portion of opening 312 of support device 310. In a second instance, covering 320 of support device 310 may be configured to completely obscure opening 312 of support device 310. In another example, one or more of coverings 324A and 324B may be configured to obscure a portion of opening 312 of support device 310. In one or more embodiments, the one or more coverings of the support device may be configured to permit at least one fan of the expansion card to move air through opening 312. For example, the at least one fan of the expansion card to move air may move air through an unobscured portion of the opening. For instance, fan 220A of expansion card 140 may move air through an unobscured portion of opening 310.

At 420, the support device may be installed in the information handling system. For example, support device 310 may be installed in IHS 110. In one or more embodiments, installing the support device in the information handling system may include fastening and/or securing the support device to a chassis of the information handling system. For example, installing support device 310 in IHS 110 may include fastening and/or securing support device 310 to chassis 115 of IHS 110. For instance, installing support device 310 in IHS 110 may include fastening and/or securing support device 310 to chassis portion 194 of IHS 110.

At 425, the expansion card may be fastened to the support device. For example, expansion card 140 may be fastened to support device 310. In one instance, expansion card 140 may be fastened to support device 310 via adjustable mechanical holder system 330 and holder device 332. In another instance, expansion card 140 may be fastened to support device 310 via one or more adjustable mechanical holder systems 330A-330E and one or more respective holder devices 332A-332E.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a memory medium, communicatively coupled to the at least one processor, that stores an operating system and at least one application executable by the at least one processor;
   a chassis;
   an information handling system card port communicatively coupled to the at least one processor;
   a support device that includes an opening that permits air to pass through and is fastened to the chassis, the support device extending along a first dimension and a second dimension transverse to the first dimension, the support device including an adjustable mechanical holder system that is coupled to the support device to translate along a length of the support device about the first dimension; and
   an expansion card coupled to the information handling system card port and fastened to the support device.

2. The information handling system of claim 1, wherein the support device includes a cover configured to obscure airflow through the opening of the support device.

3. The information handling system of claim 2, wherein the cover is configured to unroll to obscure the airflow through the opening of the support device.

4. The information handling system of claim 2, wherein the cover is a plate that is configured to obscure airflow through the opening of the support device.

5. The information handling system of claim 4, wherein the plate includes a polymer.

6. The information handling system of claim 5, wherein the plate includes a metal.

7. The information handling system of claim 2,
wherein the expansion card includes at least one fan; and
wherein the cover is configured to permit the at least one fan to move air through an unobscured portion of the opening.

8. The information handling system of claim 1, wherein the support device is fastened to an expansion opening of the chassis.

9. The information handling system of claim 8,
wherein a first sidewall of the chassis includes the expansion opening; and
wherein the support device is fastened to a second sidewall of the chassis, different from the first sidewall of the chassis.

10. A support device of an information handling system expansion card, comprising:
an opening configured to permit air to pass through;
an adjustable cover configured to obscure airflow through at least a portion of the opening;
an adjustable mechanical holder system configured to fasten the information handling system expansion card to the support device; and
a bracket configured to fasten to an expansion card opening of a first sidewall of a chassis of an information handling system,
wherein the support device extends along a first dimension and a second dimension transverse to the first dimension,
wherein the adjustable mechanical holder system is coupled to the support device to translate along a length of the support device about the first dimension.

11. The support device of claim 10, wherein the support device is configured to fasten to a second sidewall of the chassis of the information handling system.

12. The support device of claim 10, wherein the cover is configured to unroll to obscure the airflow through the opening of the support device.

13. The support device of claim 10, wherein the cover is a plate that is configured to obscure airflow through the opening of the support device.

14. The support device of claim 13, wherein the plate includes a polymer.

15. The support device of claim 13, wherein the plate includes a metal.

16. The support device of claim 13,
wherein the expansion card includes at least one fan; and
wherein the cover is configured to permit the at least one fan to move air through an unobscured portion of the opening.

17. The support device of claim 10, further comprising:
another adjustable mechanical holder system configured to fasten the expansion card to the support device.

* * * * *